(12) United States Patent
Nagao et al.

(10) Patent No.: US 8,310,737 B2
(45) Date of Patent: Nov. 13, 2012

(54) IMAGE READING APPARATUS

(75) Inventors: Yasuhiro Nagao, Kyoto (JP); Hideki Sawada, Kyoto (JP); Hiromi Ogata, Kyoto (JP); Yasuyuki Aritaki, Kyoto (JP); Hiroyuki Tajiri, Kyoto (JP); Hiroki Kawai, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 577 days.

(21) Appl. No.: 12/544,408

(22) Filed: Aug. 20, 2009

(65) Prior Publication Data

US 2010/0046045 A1 Feb. 25, 2010

(30) Foreign Application Priority Data

Aug. 21, 2008 (JP) ................. 2008-212609
Oct. 10, 2008 (JP) ................. 2008-263836
Nov. 4, 2008 (JP) ................. 2008-282827

(51) Int. Cl.
*H04N 1/04* (2006.01)
(52) U.S. Cl. ......... 358/475; 358/474; 358/509; 382/275
(58) Field of Classification Search ............. 358/474, 358/475, 509, 514; 382/275, 167
See application file for complete search history.

(56) References Cited

U.S. PATENT DOCUMENTS

| | | | | |
|---|---|---|---|---|
| 4,320,291 A * | 3/1982 | Uramoto | ........... | 250/227.11 |
| 4,360,938 A * | 11/1982 | Murphy et al. | ........... | 12/12.5 |
| 5,930,002 A * | 7/1999 | Haneda et al. | ........... | 358/300 |
| 6,304,683 B1 * | 10/2001 | Kiyohara et al. | ........... | 382/317 |
| 6,320,681 B1 * | 11/2001 | Yushiya | ........... | 358/509 |
| 6,348,947 B1 * | 2/2002 | Hatase | ........... | 348/312 |
| 6,508,579 B1 * | 1/2003 | Ruud et al. | ........... | 362/551 |
| 6,545,811 B1 * | 4/2003 | Fujimoto | ........... | 359/619 |
| 6,724,503 B1 * | 4/2004 | Sako et al. | ........... | 358/483 |
| 7,085,023 B2 * | 8/2006 | Okamoto et al. | ........... | 358/471 |
| 7,106,526 B2 * | 9/2006 | Tomita et al. | ........... | 359/726 |
| 7,209,268 B2 * | 4/2007 | Ikeda | ........... | 358/475 |
| 7,360,938 B2 * | 4/2008 | Mizuyoshi | ........... | 362/616 |
| 7,471,428 B2 * | 12/2008 | Ohara et al. | ........... | 358/497 |
| 7,551,329 B2 * | 6/2009 | Yoshikawa | ........... | 358/474 |
| 7,659,503 B2 * | 2/2010 | Shoji et al. | ........... | 250/227.11 |
| 7,835,039 B2 * | 11/2010 | Lee et al. | ........... | 358/475 |

(Continued)

FOREIGN PATENT DOCUMENTS

JP 2001-223844 8/2001

(Continued)

*Primary Examiner* — Negussie Worku
(74) *Attorney, Agent, or Firm* — Hamre, Schumann, Mueller & Larson, P.C.

(57) ABSTRACT

An image reading apparatus of the present invention includes a first light source, a first light guide, a second light source, a second light guide, light receiving elements and a lens unit. The first light source emits first light. The first light guide directs the first light from the first light source toward an image-carrying object as first linear light extending in a primary scanning direction. The second light source emits second light of a wavelength different from that of the first light. The second light guide directs the second light from the second light source toward the image-carrying object as second linear light extending in the primary scanning direction. The light receiving elements are arranged in the primary scanning direction. The first and second linear lights are reflected by the image-carrying object, and the reflected lights are guided by the lens unit toward the light receiving elements.

5 Claims, 11 Drawing Sheets

U.S. PATENT DOCUMENTS

| | | | |
|---|---|---|---|
| 7,884,978 B2 * | 2/2011 | Ikeno et al. | 358/509 |
| 7,903,298 B2 * | 3/2011 | Sawada et al. | 358/484 |
| 7,940,432 B2 * | 5/2011 | Shih et al. | 358/474 |
| 7,954,988 B2 * | 6/2011 | Lee et al. | 362/555 |
| 7,969,622 B2 * | 6/2011 | Saika | 358/475 |
| 8,045,750 B2 * | 10/2011 | Nireki | 382/100 |
| 8,240,902 B2 * | 8/2012 | Fujimoto et al. | 362/559 |
| 2006/0098247 A1 | 5/2006 | Sawada | |
| 2010/0180946 A1 * | 7/2010 | Gruhlke et al. | 136/259 |

FOREIGN PATENT DOCUMENTS

JP        2004-266313        9/2004

\* cited by examiner

IMAGE READING APPARATUS

BACKGROUND OF THE INVENTION

1. Field of the Invention

The present invention relates to an image reading apparatus used for reading images such as images printed on a document page.

2. Description of the Related Art

FIG. 12 is a sectional view illustrating an image reading apparatus B as an example of conventional image reading apparatus. The image reading apparatus B is elongated in the primary scanning direction (i.e., the direction perpendicular to the cross section shown in FIG. 12) and includes a case 91, a light source (not shown), a light guide member 92, a lens unit 93, a plurality of light receiving elements 94, a substrate 95 and a glass cover 96. The light source, the light guide member 92 and the lens unit 93 are accommodated in the case 91. The substrate 95 is fixed to the case 91, with the light receiving elements 94 carried thereon and arranged in a row extending in the primary scanning direction. The glass cover 96 is fixed to the case 91 on the side opposite to the substrate 95.

The light source is configured to emit light of a predetermined wavelength. The light guide member 92 converts the light from the light source into linear light extending in the primary scanning direction and then emits the light toward the glass cover 96, upon which an image-carrying object (not shown) is placed. The lens unit 93 converges the reflected linear light from the object onto the light receiving elements 94. Upon receiving the light, the light receiving elements 94 output a luminance signal corresponding to the amount of received light.

The image reading process by the image reading apparatus B is performed as follows. The image-carrying object is moved in the secondary scanning direction (i.e., lateral direction in FIG. 12) relative to the glass cover 96 at a constant speed, linear light is emitted from the light guide member 92 to the image-carrying object. For each line (extending in the primary scanning direction) of the surface of the image-carrying object, the light receiving elements 94 receive, via the lens unit 93, the light reflected by the image-carrying object and output a luminance signal of a level corresponding to the amount of light received. In this way, the image on the surface of the object, is read as image data. Image reading apparatuses are disclosed in e.g. JP-A-2001-223844 and JP-A-2004-266313.

Generally, paper bills and the like include an image printed with invisible ink, in addition to an image printed with visible ink. Images printed with invisible ink, which emit fluorescent light when illuminated with ultraviolet light, are useful for discriminating genuine paper bills from counterfeit paper bills. Thus, to check whether an object like a paper bill is genuine or counterfeit, it is useful to read the content printed on the object with invisible ink in addition to the content printed with visible ink. To read the content printed with visible ink by an image reading apparatus, it is necessary to illuminate the object with visible light or infrared light. To read the content printed with invisible ink by an image reading apparatus, it is necessary to illuminate the object with ultraviolet light.

Since the wavelength of visible light and that of infrared light are significantly different, the index of refraction of a light guide member with respect to visible light or infrared light is greatly different, from that with respect to ultraviolet light. Thus, when a light guide member 92 suitable for guiding visible light or infrared light is employed for the above-described image reading apparatus B, ultraviolet light cannot be directed to the image-carrying object as prosper linear light even when an ultraviolet light source for emitting light toward the light guide member is provided in the image reading apparatus in addition to a visible light source or an infrared light source. Conversely, when a light guide member 92 suitable for guiding ultraviolet light is employed for the above-described image reading apparatus B, visible light or infrared light cannot be directed to the image-carrying object as proper linear light even when a visible light source or an infrared light source for emitting light toward the light guide member is provided in the image reading apparatus in addition to an ultraviolet light source. Thus, with the conventional technique, to determine whether an object like a paper bill is genuine or counterfeit, image reading needs to be performed by using two image reading apparatuses, i.e., one including a light guide member capable of emitting visible light or infrared light as proper linear light and one including a light guide member capable of emitting ultraviolet light as proper linear light.

The present, invention has been proposed under the circumstances described above. It is, therefore, an object of the present invention to provide an image reading apparatus configured to perform reading processes using significantly different wavelengths of light.

SUMMARY OF THE INVENTION

An image reading apparatus provided according to the present invention includes a first light source, a first light guide member, a second light source, a second light guide member, a plurality of light receiving elements and a lens unit. The first light source emits first light. The first light guide member directs the first light, emitted from the first light source, toward an object to be read as first linear light extending in a primary scanning direction. The second light source emits second light of a wavelength that is different from the wavelength of the first light. The second light guide member directs the second light, emitted from the second light source, toward the object as second linear light extending in the primary scanning direction. The plurality of light receiving elements are arranged in the primary scanning direction. The lens unit causes reflected light of the first light from the object to be directed toward the light receiving elements, and also causes second reflected light of the second light from the object to be directed toward the light receiving elements.

Preferably, the first light guide member and the second light guide member extend in the primary scanning direction in parallel to each other, and the lens unit extends in the primary scanning direction and is positioned between the first and the second light guide members.

Preferably, each of the first light guide member and the second light guide member includes a first end on one side of the primary scanning direction and a second end on the other side of the primary scanning direction. The first light source is arranged on the side of the first end of the first light guide member, whereas the second light source is arranged on the side of the second end of the second light guide member.

Preferably, the first light source is an infrared light source. Preferably, in this case, the first light guide member is made of acrylic resin.

Preferably, the second light source is an ultraviolet light source. Preferably, in this case, the second light guide member is made of cyclo olefin polymer.

Preferably, the first light source is an infrared light source, the first light guide member is made of acrylic resin, the second light source is an ultraviolet light source and the second light guide member is made of cyclo olefin polymer.

DETAILED DESCRIPTION OF THE PREFERRED EMBODIMENTS

Figure 1:
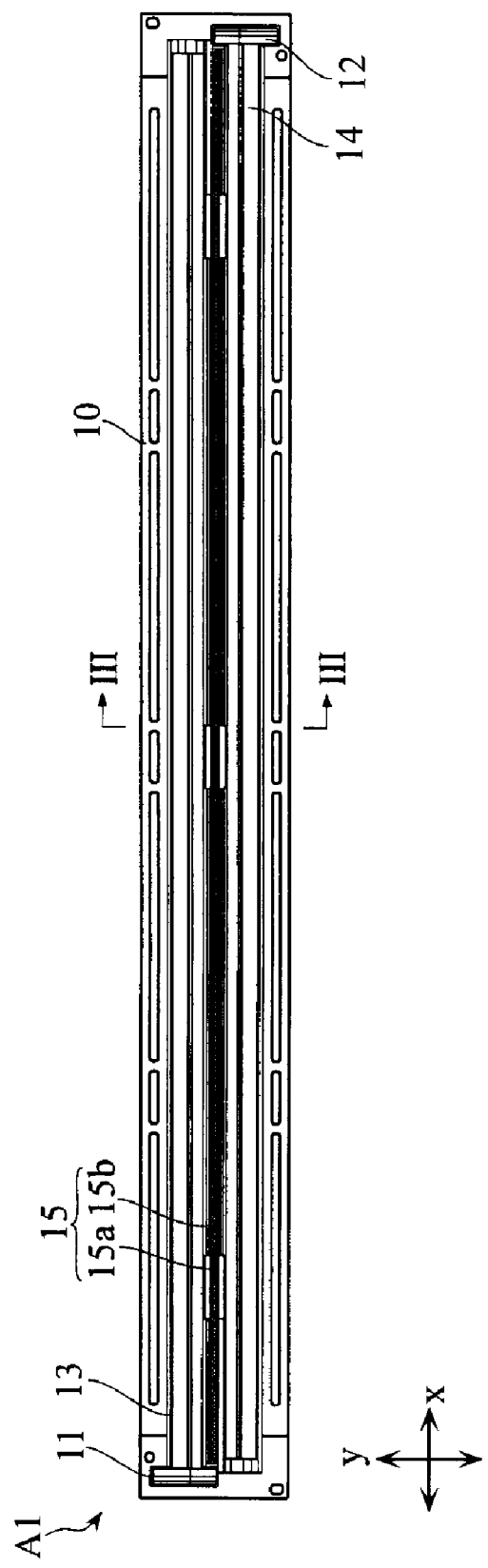
FIG. 1 is a plan view illustrating an image reading apparatus according to a first embodiment of the present invention.
Figure 2:
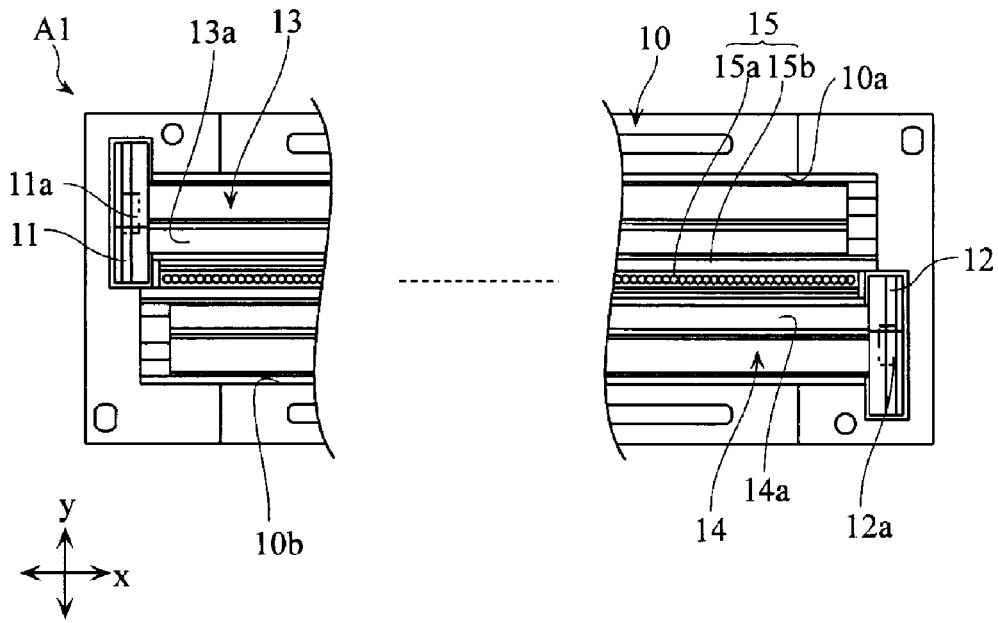
FIG. 2 is an enlarged plan view illustrating a portion of FIG. 1.
Figure 3:
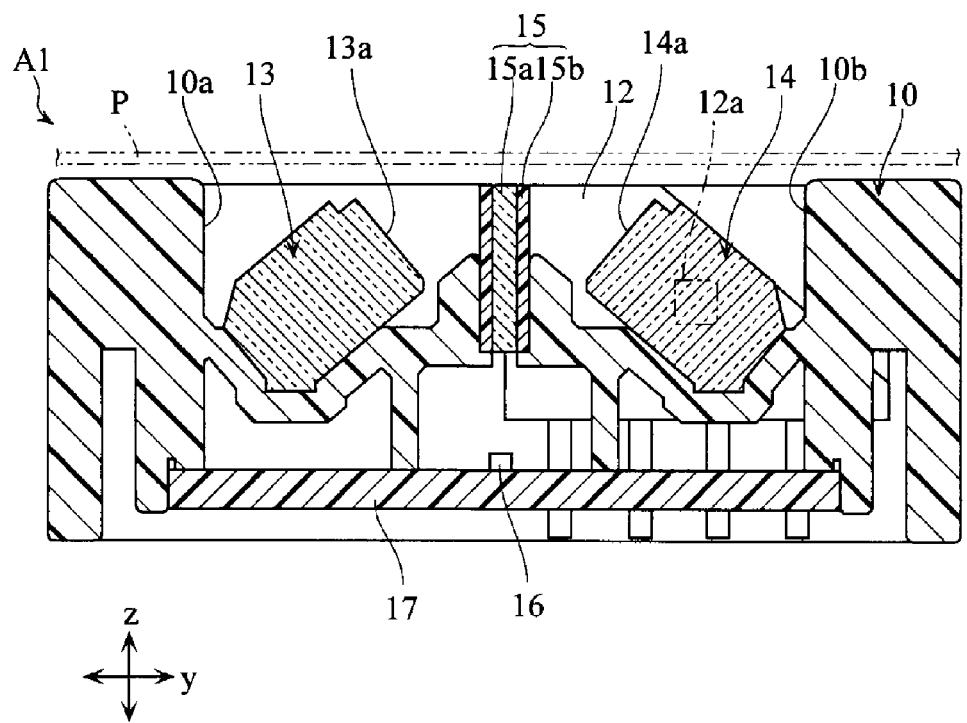
FIG. 3 is a sectional view taken along lines III-III in FIG. 1.

FIGS. 1-3 illustrate an image reading apparatus A1 according to a first embodiment. FIG. 1 is a plan view of the image reading apparatus A1. FIG. 2 is an enlarged plan view illustrating two ends of the image reading apparatus A1 that are spaced from each other in the primary scanning direction x. FIG. 3 is a sectional view taken along lines III-III in FIG. 1.

The image reading apparatus A1 includes a case 10, an infrared light source 11, an ultraviolet light source 12, light guide members 13, 14, a lens unit 15, a plurality of light receiving elements 16 and a substrate 17. The image reading apparatus A1 is designed to read images on the surface of an object P to be read (indicated by phantom lines in FIG. 3) as image data while the object P is being moved in the secondary scanning direction y (which is perpendicular to the primary scanning direction x).

In this embodiment, the object P may be a paper bill or a check, for example. On the object P, images are printed in visible ink and invisible ink which emits fluorescent light when illuminated by ultraviolet light.

The case 10 is made of e.g. a resin and has a generally cuboid form extending or elongated in the primary scanning direction x. The case 10 is formed with a hollow 10a near one side in the secondary scanning direction y and another hollow 10b near the other side. The infrared light source 11, the ultraviolet light source 12, the light guide members 13, 14, the lens unit 15, the light receiving elements 16 and the substrate 17 are arranged at predetermined positions in the case 10. A cover glass (not shown) is fixed to the upper portion of the case 10 as viewed in FIG. 3. Preferably, the cover glass is made of quartz glass, so that it transmits ultraviolet light well. In the reading process, the object P is moved along the surface of the cover glass in the secondary scanning direction y.

The infrared light source 11 includes an LED chip 11a which emits infrared light having a wavelength of e.g. about 950 nm. The infrared light source 11, arranged near an end (first end) of the light guide member 13 in the primary scanning direction x, emits light in the primary scanning direction x and into the light guide member 13.

The ultraviolet light source 12 includes an LED chip 12a which emits ultraviolet light having a wavelength of e.g. about 370 nm. The ultraviolet light source 12, arranged near an end (second end) of the light guide member 14 in the primary scanning direction x, emits light in the primary scanning direction x and into the light guide member 14. The wavelength of the ultraviolet light emitted from the ultraviolet light source 12 is significantly different from the wavelength of the infrared light emitted from the infrared light source 11 are significantly different.

The light guide member 13 extends in the primary scanning direction x and includes a first end on one side and a second end on the other side in the primary scanning direction x. The light guide member further includes a light emitting surface 13a. The light guide member 13 is arranged in the hollow 10a of the case 10 in such a manner that, the first end faces the infrared light source 11. The light guide member 13 is designed to diffuse the light from the infrared light source 11 within the light guide member 13 and then emit the light from the light emitting surface 13a toward the object P as linear light (first linear light) extending in the primary scanning direction x. Preferably, the light guide member 13 may be made of acrylic resin.

The light guide member 14 extends in the primary scanning direction x in parallel to the light guide member 13 and includes a first, end on one side and a second end on the other side in the primary scanning direction x. The light guide member further includes a light emitting surface 14a. The light guide member 14 is set in the hollow 10b of the case 10 in such a manner that the second end faces the ultraviolet light source 12. The light guide member 14 is designed to diffuse the light from the ultraviolet light source 12 within the light guide member 14 and then emit the light from the light emitting surface 14a toward the object P as linear light (second linear light) extending in the primary scanning direction x. Preferably, the light guide member 14 may be made of cyclo olefin polymer (e.g. ZEONEX 330R available from Zeon Corporation).

The lens unit 15 extends in the primary scanning direction x and is arranged between the light guide members 13 and 14. The lens unit includes a lens member 15a and a lens holder 15b. The lens member 15a is made up of e.g. a plurality of cylindrical lenses standing in the direction z shown in FIG. 3 (i.e., perpendicularly to both of the primary scanning direction x and the secondary scanning direction y) and arranged in the primary scanning direction x. The lens holder 15b is a housing made of e.g. resin and holds the lens member 15a by sandwiching in the secondary scanning direction y. The lens unit 15 converges the first linear light, which originates from the infrared light from the infrared light source 11 and is reflected by the object P, onto the light receiving elements 16. The lens unit 15 also converges the second linear light, which originates from the ultraviolet light from the ultraviolet light source 12 and is reflected by the object P, onto the light receiving elements 16.

The light receiving elements 16 are arranged on the substrate 17 in the primary scanning direction x. Upon receiving light, each of the light receiving elements 16 generates an electromotive force corresponding to the amount of light received. Based on the electromotive force, the light receiving element outputs a luminance signal for each pixel to a predetermined circuit via the wiring pattern (not shown) on the substrate 17 and a non-illustrated connector.

The substrate 17 extends in the primary scanning direction x and has an obverse surface formed with a wiring pattern (not shown). The light receiving elements 16 are mounted at the center of the obverse surface of the substrate 17 in the secondary scanning direction y.

The image reading apparatus A1 having the above-described structure is capable of performing different kinds of reading processes using light of different wavelengths. Specifically, the image reading apparatus A1 is capable of performing the reading process using infrared light (first reading process) and the reading process using ultraviolet light (second reading process).

In the first reading process by the image reading apparatus A1, infrared light is emitted from the infrared light source 11. While the object P is moved relative to the glass cover in the secondary scanning direction y at a constant speed, the first linear light (originating from the infrared light from the infrared light source 11) is directed from the light guide member 13 toward the object P. The light reflected by the object P is received, through the lens unit 15, by the light receiving elements 16 for each line (extending in the primary scanning direction x) of the surface of the object P. Each light receiving element 16 outputs a luminance signal of a level corresponding to the amount of light received. In this way, an image printed on the surface of the object P with visible ink is read as image data.

In the second reading process by the image reading apparatus A1, ultraviolet light is emitted from the ultraviolet light source 12. While the object P is moved relative to the glass cover in the secondary scanning direction y at a constant speed, the second linear light (originating from the ultraviolet light from the ultraviolet light source 12) is emitted from the light guide member 14 toward the object P. The light reflected by the object P is received, through the lens unit 15, by the light receiving elements 16 for each line (extending in the primary scanning direction x) of the surface of the object P. Each light receiving element 16 outputs a luminance signal of a level corresponding to the amount of light received. In this way, an image printed on the surface of the object P with invisible ink is read as image data.

In this way, the image reading apparatus A1 is capable of reading an image printed on the object P with visible ink and an image printed on the object P with invisible ink by itself.

In the image reading apparatus A1, the light guide members 13 and 14 extend in parallel to each other in the primary scanning direction x, and the lens unit 15 extending in the primary scanning direction x is arranged between the light guide members 13 and 14. This arrangement is suitable for sharing the lens unit 15 by the optical system including the infrared light source 11 and the light guide member 13 and the optical system including the ultraviolet light source 12 and the light guide member 14. The share of the single lens unit 15 by two optical systems leads to a reduction in size of the apparatus.

In the image reading apparatus A1, each of the light guide members 13 and 14 includes a first end on one side and a second end on the other side of the primary scanning direction x. The infrared light source 11 is arranged on the first end side of the light guide member 13, whereas the ultraviolet light source 12 is arranged on the second end side of the light guide member 14. That is, the infrared light source 11 and the ultraviolet light source 12 are arranged at two locations spaced in the primary scanning direction x. This arrangement leads to a reduction in size of the apparatus.

As noted before, it is preferable that the light guide member 13 of the image reading apparatus A1 is made of acrylic resin. The light guide member 13 made of acrylic resin is suitable for causing the infrared light traveling from the infrared light source 11 to be properly emitted from the light emitting surface 13a toward the object P as proper linear light.

As noted before, it is preferable that the light guide member 14 of the image reading apparatus A1 is made of cyclo olefin polymer. The light guide member 14 made of cyclo olefin polymer is suitable for causing the ultraviolet light traveling from the ultraviolet light source 12 to be emitted from the light emitting surface 14a toward the object P as proper linear light.

In the image reading apparatus A1, the infrared light source 11 and the ultraviolet light source 12 are arranged to emit light in the primary scanning direction x. Unlike this, however, the infrared light source 11 and the ultraviolet light source 12 may be mounted on the substrate 17 in such a manner as to emit light in the direction z. In this case, the light guide member 13 includes a light incident surface facing the infrared light source 11 mounted on the substrate 17 and a reflective surface for reflecting the infrared light entering through the light incident surface in the primary scanning direction x. Similarly, the light guide member 14 includes a light incident surface facing the ultraviolet light source 12 mounted on the substrate 17 and a reflective surface for reflecting the ultraviolet light entering through the light incident surface in the primary scanning direction x.

In the image reading apparatus A1, as the light source for emitting light to read the image printed on the object P with visible ink, a visible light source may be employed instead of the infrared light source 11.

Figure 4:
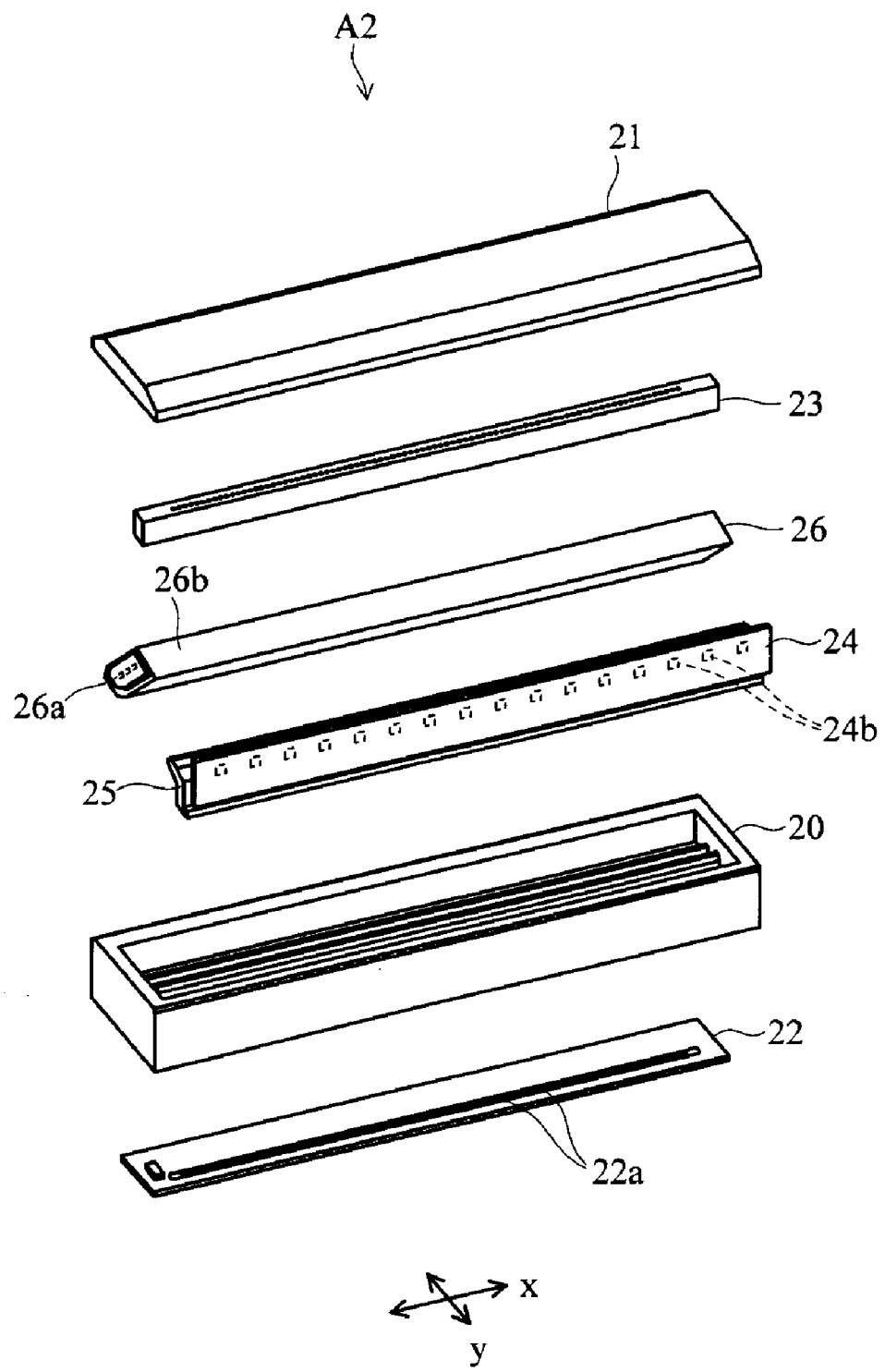
FIG. 4 is an exploded perspective view illustrating an image reading apparatus according to a second embodiment.
Figure 5:
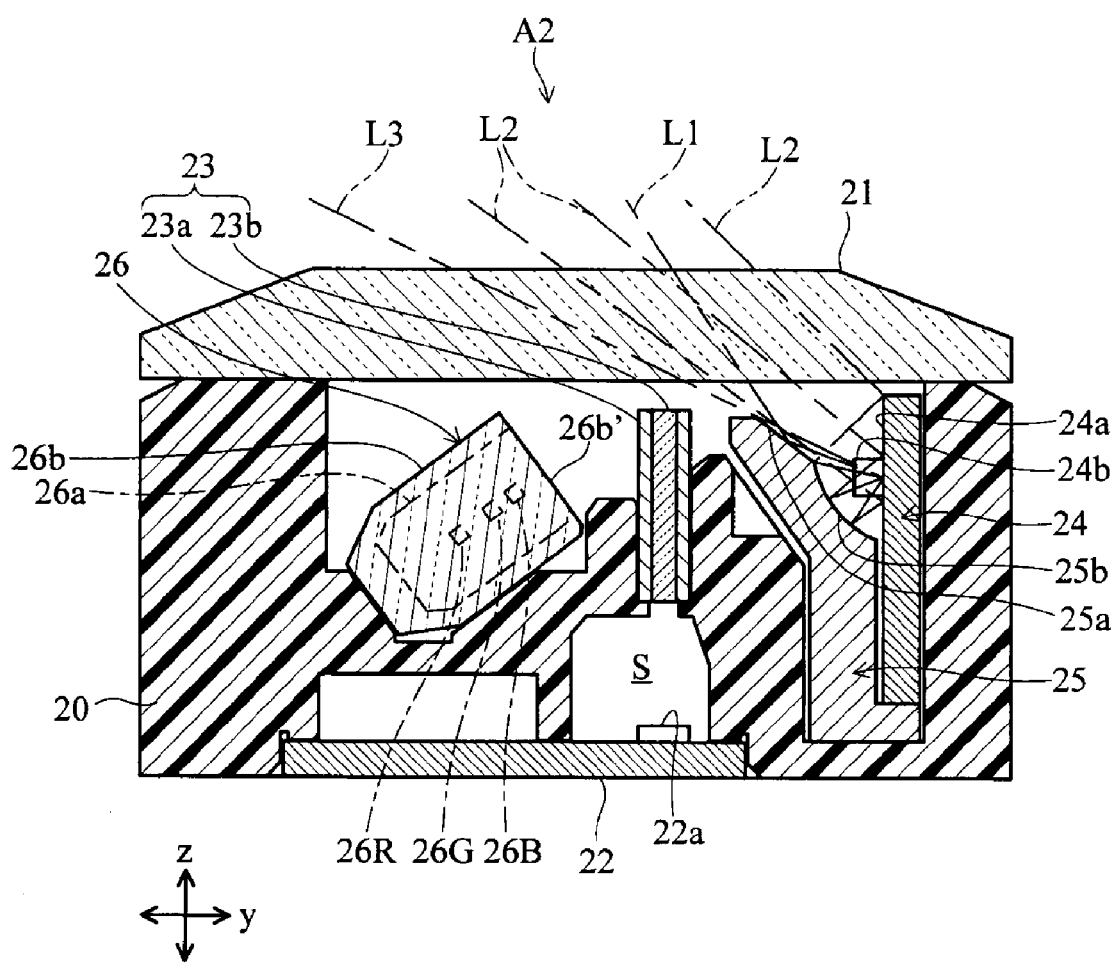
FIG. 5 is a sectional view illustrating the image reading apparatus according to the second embodiment.

FIGS. 4 and 5 illustrate an image reading apparatus A2 according to a second embodiment. FIG. 4 is an exploded perspective view of the image reading apparatus A2, whereas FIG. 5 is a sectional view of the image reading apparatus A2.

The image reading apparatus A2 extends in the primary scanning direction x and includes a case 20, a light transmitting cover 21, a light receiving substrate 22, a lens unit 23, a light emitting substrate 24, a reflector 25 and a light source unit 26. The image reading apparatus A2 is designed to read an image on a surface of an object to be read (not shown), which is held in close contact with the light transmitting cover 21 and moved in the secondary scanning direction y during the reading operation.

As illustrated in FIG. 4, the case 20 extends in the primary scanning direction x. The case 20 has a top open end for enabling light to travel toward the image-carrying object or from the image-carrying object. The top opening of the case 20 is closed by the light transmitting cover 21. The lens unit 23, the light emitting substrate 24, the reflector 25 and the light source unit 26 are arranged in the case 20. The light receiving substrate 22 is mounted to the bottom of the case 20. As shown in FIG. 5, a closed space S is defined between the light receiving substrate 22 and the lens unit 23 in the case 20.

The light transmitting cover 21 is made of e.g. transparent resin or transparent glass. In the reading process, the image-carrying object is held in close contact with the outer surface of the light transmitting cover 21, and light is guided from the image-carrying object into the case through the light transmitting cover 21.

On the light receiving substrate 22, a plurality of light receiving elements 22a are arranged in the primary scanning direction x. The light receiving substrate 22 is arranged to extend horizontally at the bottom of the case 20. The light receiving elements 22a are positioned directly below the lens unit 23 in the closed space S to receive the light passing through the lens unit 23. Upon receiving light, each of the light receiving elements 22a generates an electromotive force corresponding to the amount of light received. Based on the electromotive force, the light receiving element outputs a luminance signal for each pixel to a predetermined circuit via the wiring pattern (not shown) on the light receiving substrate 22 and a non-illustrated connector.

The lens unit 23 includes a lens holder 23a extending in the primary scanning direction x and a plurality of rod lenses 23b held by the lens holder. The rod lenses 23b stand in the thickness direction z shown in FIG. 5 (i.e., perpendicularly to both of the primary scanning direction x and the secondary scanning direction y) and are arranged in the primary scanning direction x. The focal point of each of the rod lenses 23b is set on the outer surface of the light transmitting cover 21 so that the image on the focal point can be formed on each of the light receiving elements 22a. In the reading process, the light (reflected light) from the image-carrying object, which is spaced from the light receiving substrate 22 in the thickness direction z, is guided to the light receiving elements 22a by the lens unit 23.

The light emitting substrate 24 has a mount surface 24a, on which a plurality of light emitting elements 24b are arranged in the primary scanning direction x. The mount surface 24a is designed to reflect light. The light emitting elements 24b are e.g. infrared LEDs and arranged on the mount surface 24a of the light emitting substrate 24 at a position deviated toward the light transmitting cover 21. The light emitting substrate 24 is spaced from the lens unit 23 in the secondary scanning direction y and arranged in the case 20, with the mount surface 24a standing in the thickness direction z and oriented toward the lens unit 23.

The reflector 25 has a reflective surface for reflecting the light from the light emitting elements 24b toward a region above the lens unit 23 (i.e., toward the image-carrying object). The reflective surface of the reflector 25 faces the light emitting surfaces of the light emitting elements 24b. The reflective surface includes a direct reflection surface 25a for reflecting the light from the light emitting elements 24b directly toward the region above the lens unit 23. The reflective surface further includes an indirect reflection surface 25b for reflecting the light from the light emitting elements 24b toward the mount surface 24a of the light emitting substrate 24 to indirectly cause the light to travel toward the region above the lens unit 23 via the mount surface 24a. The direct reflection surface 25a is a flat inclined surface provided at an end of the reflector 25 and positioned closer to the light transmitting cover 21 than the indirect reflection surface 25b is in the thickness direction z. The indirect reflection surface 25b is a concave surface connected to the direct reflection surface 25a and provided at a position overlapping the light emitting elements 24b in the thickness direction z. FIG. 5 illustrates light L1, light L2 and light L3. The light L1 emitted from the light emitting elements 24b is reflected by the direct reflection surface 25a to travel toward the light transmitting cover 21 or the image-carrying object. The light L2 emitted from the light emitting elements 24b is reflected first by the indirect reflection surface 25b and then by the mount surface 24a to travel toward the light transmitting cover 21 or the image-carrying object. The light L3 travels toward the light transmitting cover 21 or the image-carrying object without being reflected by the direct reflection surface 25a or the indirect reflection surface 25b. The direct reflection surface 25a and the indirect reflection surface 25b function to provide a long optical path between the light emitting elements 24b and the image-carrying object. The direct reflection surface 25a and the indirect reflection surface 25b further function to diffuse the light from the light emitting elements 24b in the primary scanning direction x so that the intensity distribution of the light for illuminating the image-carrying object is uniform.

The light source unit 26 includes a light source substrate 26a and a light guide member 26b extending in the primary scanning direction x and is arranged on a side of the lens unit 23 opposite to the light emitting substrate 24. On the light source substrate 26a, light sources 26R, 26G and 26B for emitting visible light of wavelengths which are different from that of the light emitting elements 24b are mounted. As illustrated in FIG. 4, the light source substrate is attached to an end of the light guide member 26b. In this embodiment, the light sources 26R, 26G and 26B emit red light, green light and blue light, respectively. The light guide member 26b includes a light emitting surface 26b'. The light from the light sources 26R, 26G, 26B entering the light guide member through the end is diffused within the light guide member 26b and emitted from the light emitting surface 26b' toward the image-carrying object as linear light extending in the primary scanning direction x.

The image reading apparatus A2 having the above-described structure is capable of performing the first reading process for reading an RGB color image and the second reading process for reading an infrared image.

In the first reading process by the image reading apparatus A2, while the object P is moved relative to the light transmitting cover 21 in the secondary scanning direction y at a constant speed, each line (extending in the primary scanning direction x) of the object is successively illuminated with red light, green light and blue light, emitted from the light, source unit 26 in a predetermined order. In each of the illumination processes using red light, green light and blue light for each line of the surface of the object, the light reflected by the object is received by the light receiving elements 22a through the lens unit 23, and the light receiving elements 22a output a luminance signal of a level corresponding to the amount of light received. In this way, the RGB color image on the surface of the object is read as image data.

In the second reading process by the image reading apparatus A2, while the object P is moved relative to the light transmitting cover 21 in the secondary scanning direction y at a constant speed, the object is illuminated with infrared light emitted from the light emitting elements 24b. The light reflected by the object is received by the light receiving elements 22a through the lens unit 23 for each line of the surface of the object, and the light receiving elements 22a output a luminance signal of a level corresponding to the amount of light received. In this way, the infrared image on the surface of the object is read as image data.

As noted before, in the image reading apparatus A2, the light emitting substrate 24, on which the light emitting elements 24b for emitting infrared light are mounted, is arranged in the case 20 to extend vertically, i.e., with the mount surface 24a standing in the thickness direction z. This arrangement is suitable for reducing the size of the apparatus. Unlike this, when the light emitting substrate 24 is arranged to extend horizontally similarly to the light receiving substrate 22, the dimension of the apparatus in the secondary scanning direction y increases. The image reading apparatus A2 includes the light emitting substrate 24 and the light source unit 26 as different light emitting means, and it is strongly demanded that such an image reading apparatus including different kinds of light emitting means is reduced in size.

In the image reading apparatus A2, most part of the infrared light emitted from the light emitting elements 24b reaches the image-carrying object by way of the direct reflection surface 25a and the indirect reflection surface 25b. Thus, although infrared light, whose wavelength is longer than that of visible light, does not easily diffuse, the direct reflection surface 25a and the indirect reflection surface 25b provide a long optical path between the light emitting elements 24b and the image-carrying object. Thus, most part of the infrared light emitted from the light emitting elements 24b diffuses in various directions before reaching the image-carrying object. Thus, although the distance from the light emitting elements 24b to the image-carrying object is relatively short in the image reading apparatus A2, the light from the light emitting elements 24b is efficiently diffused in the primary scanning direction x before reaching the object. Thus, the intensity distribution of the light for illuminating the image-carrying object is made uniform. Thus, with the image reading apparatus A2, an infrared image without shades is obtained.

Figure 6:
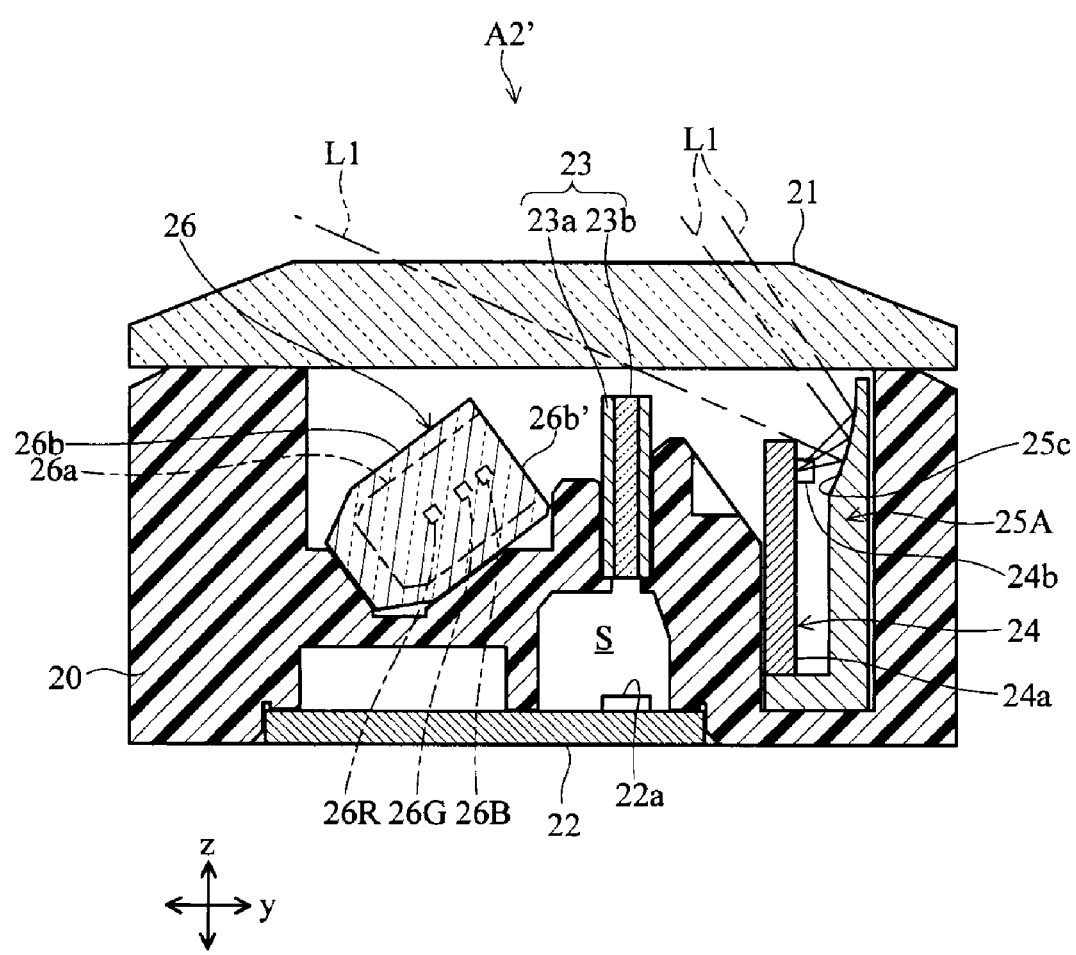
FIG. 6 is a sectional view illustrating a first variation of the image reading apparatus according to the second embodiment.

FIG. 6 is a sectional view illustrating an image reading apparatus A2' as a first variation of the image reading apparatus A2. The image reading apparatus A2' extends in the primary scanning direction x (i.e., perpendicularly to the cross section shown in FIG. 6) and includes a case 20, a light transmitting cover 21, a light receiving substrate 22, a lens unit 23, a light emitting substrate 24A, a reflector 25A and a light source unit 26. The image reading apparatus A2' is designed to read an image on a surface of an object to be read (not shown), which is held in close contact with the light transmitting cover 21 and moved in the secondary scanning direction y during the reading operation. The image reading apparatus A2' differs from the image reading apparatus A2 in that it includes the light emitting substrate 24A and the reflector 25A instead of the light emitting substrate 24 and the reflector 25.

The light emitting substrate 24A has a mount surface 24a, on which a plurality of light emitting elements 24b are arranged in the primary scanning direction x. The mount surface 24a is designed to reflect light. The light emitting elements 24b are e.g. infrared LEDs and arranged on the mount surface 24a of the light emitting substrate 24A at a position deviated toward the light transmitting cover 21. The light emitting substrate 24A is spaced from the lens unit 23 in the secondary scanning direction y and arranged in the case 20, with the mount surface 24a standing in the thickness direction z and oriented in the opposite direction of the lens unit 23.

The reflector 25A has a reflective surface 25c for reflecting the light from the light emitting elements 24b on the light emitting substrate 24A toward a region above the lens unit 23 (i.e., toward the image-carrying object). The reflective surface 25c faces the light emitting surfaces of the light emitting elements 24b. The reflective surface is a concave surface.

The image reading apparatus A2' having the above-described structure is capable of performing the first reading process for reading a color image and the second reading process for reading an infrared image.

In the first reading process by the image reading apparatus A2', while the image-carrying object is moved relative to the light transmitting cover 21 in the secondary scanning direction y at a constant speed, each line (extending in the primary scanning direction x) of the object is successively illuminated with red light, green light and blue light emitted from the light source unit 26 in a predetermined order. In each of the illumination processes using red light, green light and blue light for each line of the surface of the object, the light reflected by the object is received by the light receiving elements 22a through the lens unit 23, and the light, receiving elements 22a output a luminance signal of a level corresponding to the amount, of light received. In this way, the RGB color image on the surface of the object is read as image data.

In the second reading process by the image reading apparatus A2, while the image-carrying object is moved relative to the light transmitting cover 21 in the secondary scanning direction y at a constant speed, the object is illuminated with infrared light emitted from the light emitting elements 24b. The light reflected by the object is received by the light receiving elements 22a through the lens unit 23 for each line of the surface of the object, and the light receiving elements 22a output a luminance signal of a level corresponding to the amount of light received. In this way, the infrared image on the surface of the object is read as image data.

As noted before, in the image reading apparatus A2', the light emitting substrate 24A, on which the light emitting elements 24b for emitting infrared light are mounted, is arranged in the case 20 to extend vertically, i.e., with the mount surface 24a standing in the thickness direction z. As described with respect to the image reading apparatus A2, this arrangement is suitable for reducing the size of the apparatus.

In the image reading apparatus A2', most part of the infrared light emitted from the light emitting elements 24b reaches the image-carrying object, by way of the reflective surface 25c. Thus, although infrared light, whose wavelength is longer than that of visible light, does not easily diffuse, the reflective surface 25c provides a long optical path between the light emitting elements 24b and the image-carrying object. Thus, most part of the infrared light emitted from the light emitting elements 24b diffuses in various directions before reaching the image-carrying object. Thus, although the distance from the light emitting elements 24b to the image-carrying object is relatively short in the image reading apparatus A2', the light from the light emitting elements 24b is efficiently diffused in the primary scanning direction x before reaching the object. Thus, the intensity distribution of the light for illuminating the image-carrying object is made uniform. Thus, with the image reading apparatus A2', an infrared image without shades is obtained.

Figure 7:
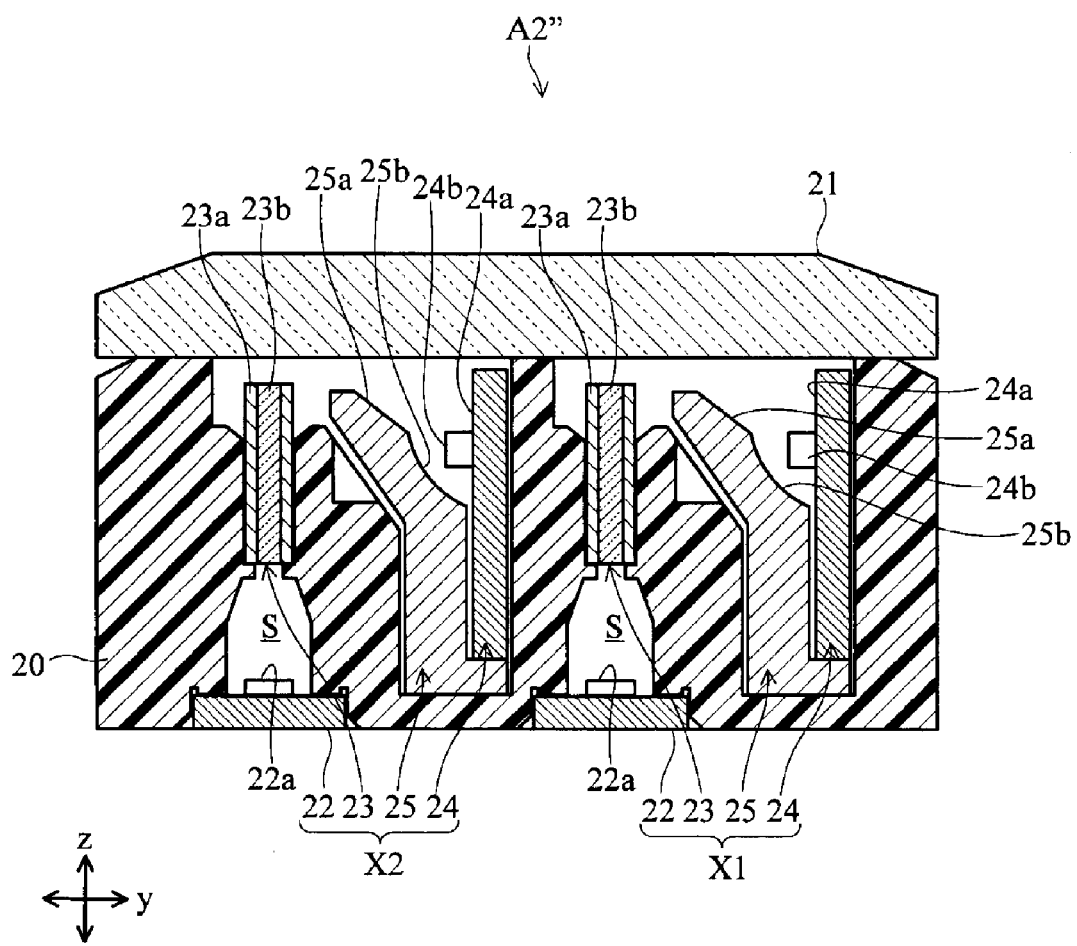
FIG. 7 is a sectional view illustrating a second variation of the image reading apparatus according to the second embodiment.

FIG. 7 is a sectional view illustrating an image reading apparatus A2" as a second variation of the image reading apparatus A2. The image reading apparatus A2" extends in the primary scanning direction x (i.e., perpendicularly to the cross section shown in FIG. 7) and includes a case 20, a light transmitting cover 21, two light receiving substrates 22, two lens units 23, two light emitting substrates 24 and two reflectors 25. The image reading apparatus A2' is designed to read an image on a surface of an object to be read, which is held in close contact with the light transmitting cover 21 and moved in the secondary scanning direction y during the reading operation. The image reading apparatus A2" differs from the image reading apparatus A2 in that it includes a set of light receiving substrate 22, lens unit 23 and light emitting substrate 24 instead of the light source unit 26.

In the image reading apparatus A2", two optical systems X1 and X2, each of which is made up of a light receiving substrate 22, a lens unit 23, a light emitting substrate 24 and a reflector 25, are arranged in parallel to each other in the case 20. In this embodiment, the light emitting elements 24b of the optical system X1 are infrared LEDs and arranged in the primary scanning direction x on the mount surface 24a of the corresponding light emitting substrate 24. The light emitting elements 24b of the optical system X2 are white light sources and arranged in the primary scanning direction x on the mount surface 24a of the corresponding light emitting substrate 24.

The image reading apparatus A2" having the above-described structure is capable of performing the first reading process for reading an infrared image and the second reading process for reading a white light image.

In the first reading process by the image reading apparatus A2", while the image-carrying object is moved relative to the light transmitting cover 21 in the secondary scanning direction y at a constant speed, the object is illuminated with infrared light emitted from the light emitting elements 24b of the optical system X1. In the optical system X1, the light reflected by the image-carrying object is received, through the lens unit 23, by the light receiving elements 22a for each line of the surface of the object. Each light receiving element 22a outputs a luminance signal of a level corresponding to the amount of light received. In this way, an infrared image on the surface of the object is read as image data.

In the second reading process by the image reading apparatus A2", while the image-carrying object is moved relative to the light transmitting cover 21 in the secondary scanning direction y at a constant speed, the object is illuminated with ultraviolet light emitted from the light emitting elements 24b of the optical system X2. In the optical system X2, the light reflected by the image-carrying object is received, through the lens unit 23, by the light receiving elements 22a for each line of the surface of the object. Each light receiving element 22a outputs a luminance signal of a level corresponding to the amount of light received. In this way, a white light image on the surface of the object is read as image data.

In the image reading apparatus A2", both of the light emitting substrate 24 of the optical system X1, on which the light emitting elements 24b for emitting infrared light are mounted, and the light emitting substrate 24 of the optical system X2, on which the light emitting elements 24b for emitting visible light are mounted, are arranged in the case 20 to extend vertically, i.e., with the mount surface 24a standing in the thickness direction z. As described with respect to the image reading apparatus A2, this arrangement is suitable for reducing the size of the apparatus.

In each of the optical systems X1 and X2 of the image reading apparatus A2", most part of the light emitted from the light emitting elements 24b reaches the image-carrying object by way of the direct, reflection surface 25a and the indirect, reflection surface 25b. The direct reflection surface 25a and the indirect reflection surface 25b provide a long optical path between the light emitting elements 24b and the image-carrying object. Thus, most part of the light emitted from the light emitting elements 24b diffuses in various directions before reaching the image-carrying object. Thus, although the distance from the light emitting elements 24b to the image-carrying object is relatively short in each of the optical systems X1 and X2 of the image reading apparatus A2", the light from the light emitting elements 24b is efficiently diffused in the primary scanning direction x before reaching the object. Thus, the intensity distribution of the light for illuminating the image-carrying object, is made uniform. Thus, with the image reading apparatus A2", an image without shades is obtained.

Although the image reading apparatus A2" in this embodiment includes the above-described optical systems X1 and X2, the image reading apparatus may include three or more optical systems each of which is made up of a light receiving substrate 22, a lens unit 23, a light emitting substrate 24 and a reflector 25.

Figure 8:
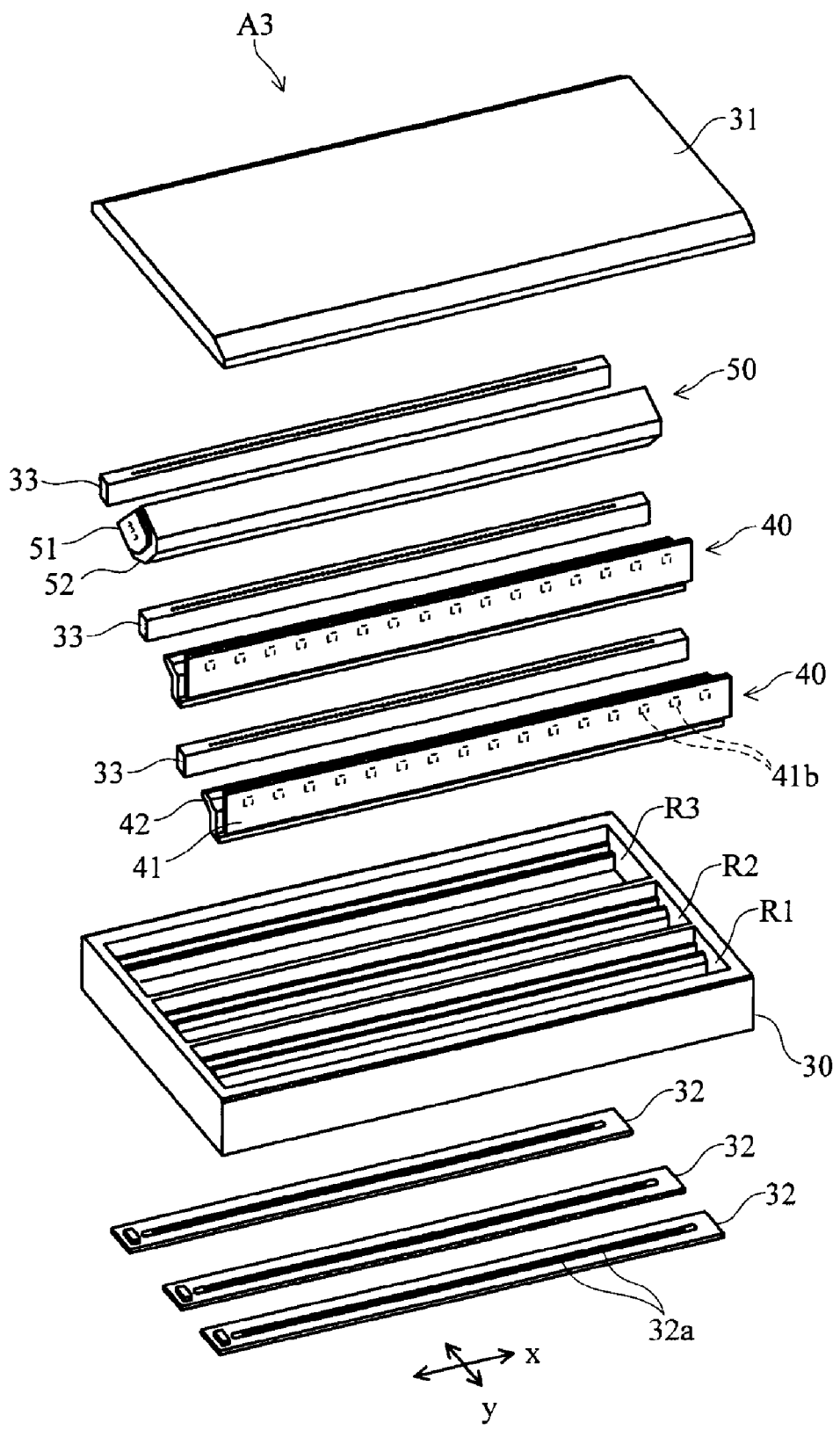
FIG. 8 is an exploded perspective view illustrating an image reading apparatus according to a third embodiment.
Figure 9:
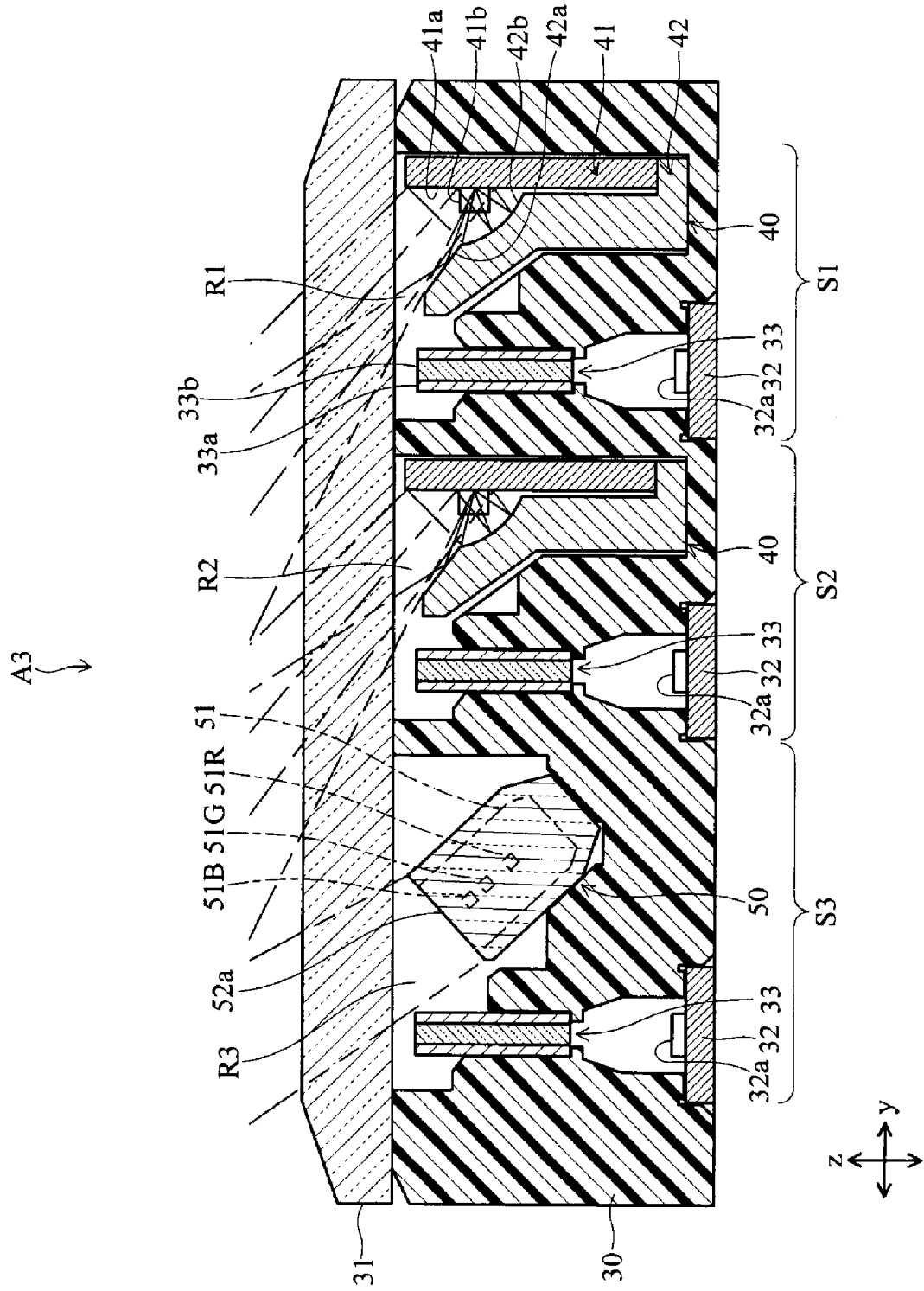
FIG. 9 is a sectional view illustrating the image reading apparatus according to the third embodiment.

FIGS. 8 and 9 illustrate an image reading apparatus A3 according to a third embodiment of the present invention. FIG. 8 is an exploded perspective view of the image reading apparatus A3. FIG. 9 is a sectional view of the image reading apparatus A3.

The image reading apparatus A3 includes a case 30, a light transmitting cover 31 and three optical systems S1, S2, S3 arranged in the secondary scanning direction y in the case 30.

The image reading apparatus A3 is designed to read an image on a surface of an object to be read (not shown), which is held in close contact with the light transmitting cover 31 and moved in the secondary scanning direction y during the reading operation.

As illustrated in FIG. 8, the case 30 extends in the primary scanning direction x. The case 30 has a top open end for enabling light to travel toward the image-carrying object or from the image-carrying object. The top opening of the case 30 is closed by the light transmitting cover 31. The case 30 is formed with inner spaces R1-R3 for accommodating the optical systems S1-S3 as arranged in the secondary scanning direction y.

The light transmitting cover 31 is made of e.g. transparent resin or transparent glass. In the reading process, the image-carrying object is held in close contact with the outer surface of the light transmitting cover 31, and light travels from the object into the inner spaces R1-R3 of the case 30 through the light transmitting cover 31. Each of the optical systems S1 and S2 includes a light receiving substrate 32, a lens unit 33 and a light emission unit 40. The optical system S3 includes a light receiving substrate 32, a lens unit 33 and a light emission unit 50.

The light receiving substrates 32 is mounted to the bottom of each of the inner spaces R1-R3 of the case 30. On each light receiving substrate 32, a plurality of light receiving elements 32a are arranged in the primary scanning direction x. The light receiving substrate 32 is arranged to extend horizontally. The light receiving elements 32a are positioned directly below the corresponding lens unit 33 to receive the light passing through the lens unit 33. Upon receiving light, each of the light receiving elements 32a generates an electromotive force corresponding to the amount of light received. Based on the electromotive force, the light receiving element outputs a luminance signal for each pixel to a predetermined circuit via the wiring pattern (not shown) on the substrate and a non-illustrated connector.

Each of the lens unit 33 includes a lens holder 33a extending in the primary scanning direction x and a plurality of rod lenses 33b held by the lens holder. The rod lenses 33b stand in the thickness direction z shown in FIG. 9 (i.e., perpendicularly to both of the primary scanning direction x and the secondary scanning direction y) and are arranged in the primary scanning direction x. The focal point of each of the rod lenses 33b is set on the outer surface of the light transmitting cover 31 so that the image on the focal point can be formed on each of the light receiving elements 32a. In the reading process, the light (reflected light) from the image-carrying object, which is spaced from the light receiving substrate 32 in the thickness direction z, is guided to the light receiving elements 32a by the lens unit 33.

The light emission unit 40 of each of the optical systems S1 and S2 is spaced from the corresponding lens unit 33 in the secondary scanning direction y and includes a light emitting substrate 41 and a reflector 42.

Each of the light emitting substrates 41 has amount surface 41a, on which a plurality of light emitting elements 41b are arranged in the primary scanning direction x. The mount surface 41a is designed to reflect light. On the mount surface 41a of the light emitting substrate 41, the light emitting elements 41b are arranged at a position deviated toward the light transmitting cover 31. The light emitting substrate 41 is spaced from the corresponding lens unit 33 in the secondary scanning direction y and arranged in the case 30, with the mount surface 41a standing in the thickness direction z and oriented toward the corresponding lens unit 33. In this embodiment, the light emitting elements 41b on the light emitting substrate 41 of the optical system S1 are infrared LEDs, whereas the light emitting elements 41b on the light emitting substrate 41 of the optical system S2 are ultraviolet LEDs.

Each of the reflectors 42 has a reflective surface for reflecting the light from the light emitting elements 41b toward a region above the corresponding lens unit 33 (i.e., toward the image-carrying object). The reflective surface of the reflector 42 faces the light emitting surfaces of the light emitting elements 41b. The reflective surface includes a direct reflection surface 42a for reflecting the light from the light emitting elements 41b directly toward the region above the lens unit 33. The reflective surface further includes an indirect reflection surface 42b for reflecting the light from the light emitting elements 41b toward the mount surface 41a of the light emitting substrate 41 to indirectly cause the light to travel toward the region above the lens unit 33. The direct reflection surface 42a is a flat inclined surface provided at an end of the reflector 42 and positioned closer to the light transmitting cover 31 than the indirect reflection surface 42b is in the thickness direction z. The indirect reflection surface 42b is a concave surface connected to the direct reflection surface 42a and provided at a position overlapping the light emitting elements 41b in the thickness direction z. FIG. 9 illustrates the light emitted from the light emitting elements 41b and reflected by the direct reflection surface 42a to travel toward the light transmitting cover 31 or the image-carrying object. FIG. 9 also illustrates the light emitted from the light emitting elements 41b and reflected first by the indirect reflection surface 42b and then by the mount surface 41a to travel toward the light transmitting cover 31 or the image-carrying object. FIG. 9 also illustrate the light traveling toward the light transmitting cover 31 or the image-carrying object, without being reflected by the direct reflection surface 42a or the indirect reflection surface 42b. The direct reflection surface 42a and the indirect reflection surface 42b function to provide a long optical path between the light emitting elements 41b and the image-carrying object. The direct reflection surface 42a and the indirect reflection surface 42b further function to diffuse the light from the light emitting elements 41b in the primary scanning direction x (i.e., perpendicularly to the cross section shown in FIG. 9) so that the intensity distribution of the light for illuminating the image-carrying object is uniform.

The light emission unit 50 of the optical systems S3 is spaced from the corresponding lens unit 33 in the secondary scanning direction y and includes a light source substrate 51 and a light guide member 52 extending in the primary scanning direction x.

On the light source substrate 51, light sources 51R, 51G and 51B for emitting visible light of wavelengths which are different from that of the light emitting elements 41b are mounted. As illustrated in FIG. 8, the light source substrate is attached to an end of the light guide member 52. In this embodiment, the light sources 51R, 51G and 51B emit red light, green light and blue light, respectively. The light guide member 52 includes a light emitting surface 52a. The light from the light sources 51R, 51G, 51B entering the light guide member through the end is diffused within the light guide member 52 and emitted from the light emitting surface 52a toward the image-carrying object as linear light extending in the primary scanning direction x.

The image reading apparatus A3 having the above-described structure is capable of simultaneously performing the reading process using the optical system S1 (first reading process), the reading process using the optical system S2 (second reading process) and the reading process using the optical system S3 (third reading process), while holding the image-carrying object in close contact with the light transmitting cover 31 and moving the object in the secondary scanning direction y at a constant speed.

In the first reading process by the optical system S1, the object is illuminated with infrared light emitted from the light emitting elements 41b of the light emission unit 40, which are infrared LEDs. The light reflected by the image-carrying object is received, through the lens unit 33, by the light receiving elements 32a for each line (extending in the primary scanning direction x) of the surface of the object. Each light receiving element 32a outputs a luminance signal of a level corresponding to the amount of light received. In this way, an infrared image on the surface of the object is read as image data.

In the second reading process by the optical system S2, the object is illuminated with ultraviolet light emitted from the light emitting elements 41b of the light emission unit 40, which are ultraviolet LEDs. The light reflected by the image-carrying object is received, through the lens unit 33, by the light receiving elements 32a for each line of the surface of the object. Each light receiving element 32a outputs a luminance signal of a level corresponding to the amount of light received. In this way, an ultraviolet image (i.e., image printed with invisible ink) on the surface of the object is read as image data.

In the third reading process by the optical system S3, each line of the image-carrying object is successively illuminated with red light, green light and blue light emitted from the light source unit 50 in a predetermined order. In each of the illumination processes using red light, green light and blue light for each line of the surface of the object, the light reflected by the object is received by the light receiving elements 32a through the lens unit 33, and the light receiving elements 32a output a luminance signal of a level corresponding to the amount of light received. In this way, the RGB color image on the surface of the object is read as image data.

As described above, the image reading apparatus A3 is capable of simultaneously performing different kinds of reading processes using light of different wavelengths. Thus, when the image reading apparatus A3 is incorporated into a hand-held scanner, the hand-held scanner is capable of reading a color image, an infrared image and an ultraviolet image of an object by a single reading operation. When the image reading apparatus A3 is incorporated into a stationary scanner, it is not necessary to additionally incorporate another image reading apparatus into the stationary scanner, and the incorporation of a single image reading apparatus A3 is sufficient.

In the image reading apparatus A3, the light emitting substrate 41 of each of the optical systems S1 and S2 is arranged in the case 30 to extend vertically, i.e., with the mount surface 41a standing in the thickness direction z. As described with respect to the image reading apparatus A2, this arrangement is suitable for reducing the size of the apparatus.

In each of the optical systems S1 and S2 of the image reading apparatus A3, most part of the light emitted from the light emitting elements 41b reaches the image-carrying object by way of the direct reflection surface 42a and the indirect reflection surface 42b. The direct reflection surface 41a and the indirect reflection surface 42b provide a long optical path between the light emitting elements 41b and the image-carrying object. Thus, most part of the light emitted from the light emitting elements 41b diffuses in various directions before reaching the image-carrying object. Thus, although the distance from the light emitting elements 41b to the image-carrying object is relatively short in each of the optical systems S1 and S2 of the image reading apparatus A3, the light from the light emitting elements 41b is efficiently diffused in the primary scanning direction x before reaching the object. Thus, the intensity distribution of the light for illuminating the image-carrying object is uniform. Thus, with the image reading apparatus A3, an infrared image without shades is obtained.

Figure 10:
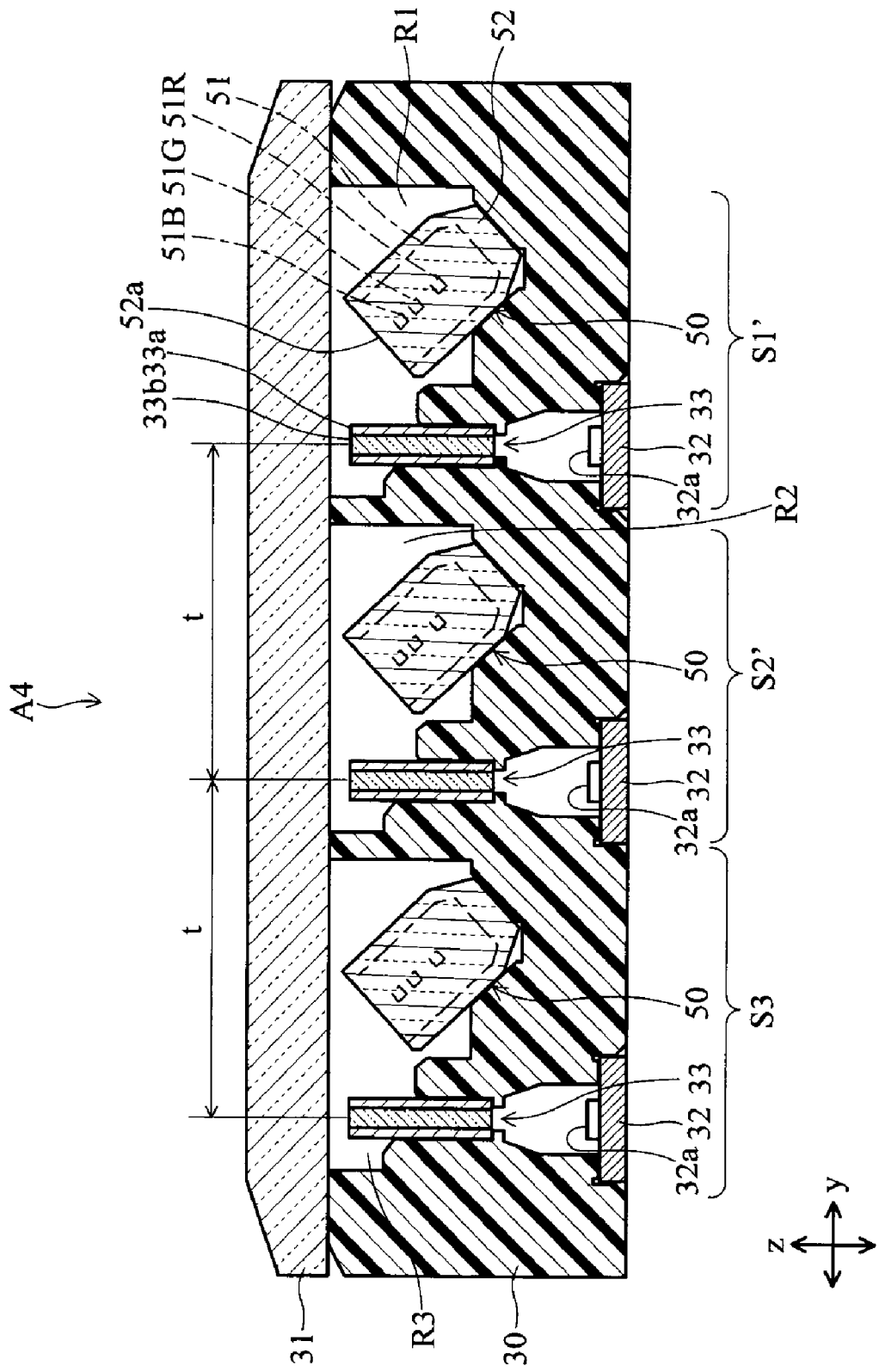
FIG. 10 is a sectional view illustrating an image reading apparatus according to a fourth embodiment.

FIG. 10 is an exploded perspective view of an image reading apparatus A4 according to a fourth embodiment of the present invention.

The image reading apparatus A4 includes a case 30, a light transmitting cover 31 and three optical systems S1', S2', S3 arranged in the secondary scanning direction y in the case 30. The image reading apparatus A4 is designed to read an image on a surface of an object to be read (not shown), which is held in close contact with the light transmitting cover 31 and moved in the secondary scanning direction y during the reading operation. The image reading apparatus A4 differs from the image reading apparatus A3 in that the image reading apparatus A4 includes optical systems S1' and S2' instead of the optical systems S1 an S2.

Each of the optical systems S1', S2' and S3 includes a light receiving substrate 32, a lens unit 33 and a light emission unit 50 and has the same structure as that of the optical system S3 of the image reading apparatus A3. The optical systems S1', S2' and S3 are arranged at an equal pitch t in the secondary scanning direction y.

The image reading apparatus A4 having the above-described structure performs a reading operation as follows.

Figure 11:
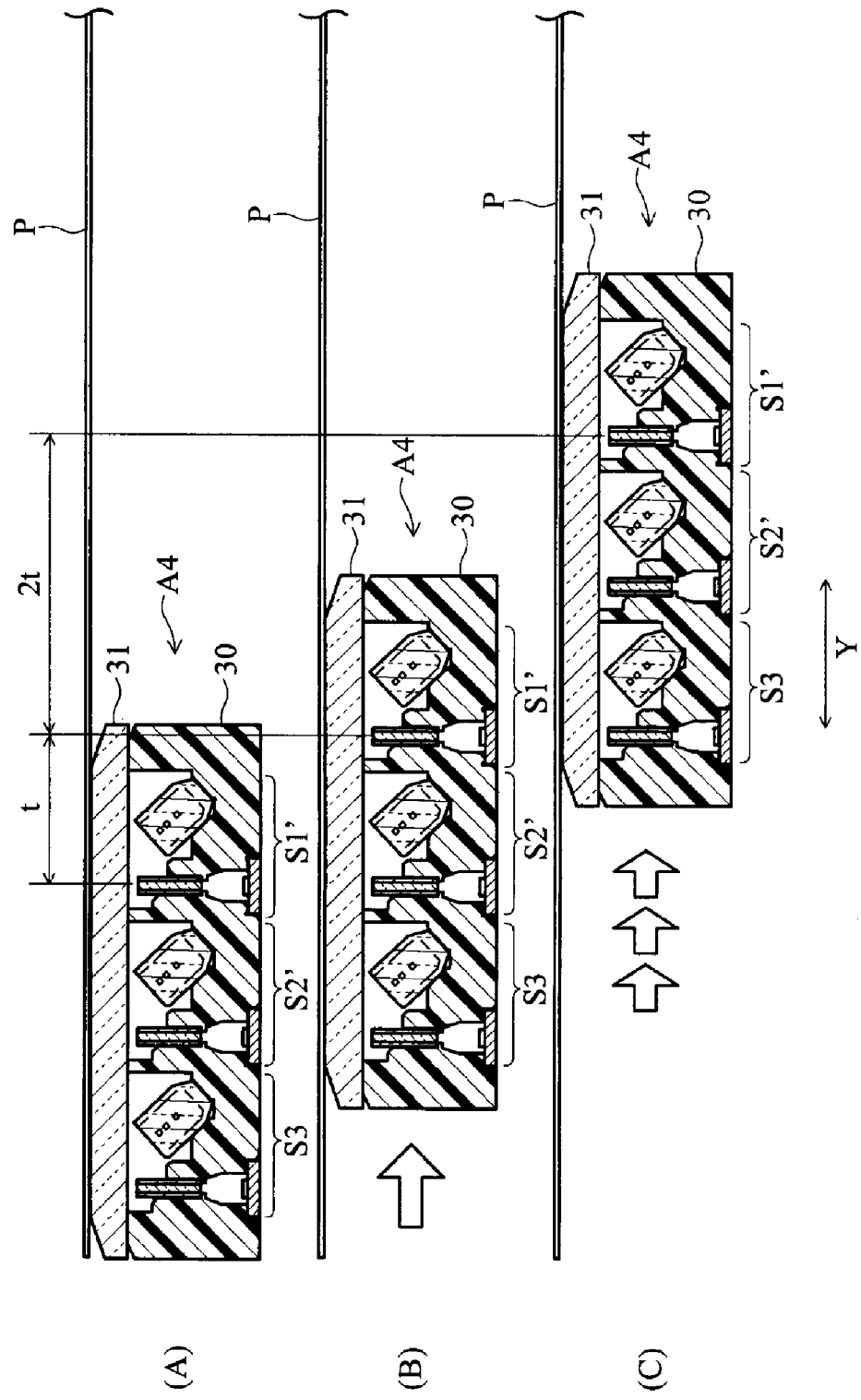
FIG. 11 illustrates an image reading process by the image reading apparatus according to the fourth embodiment.
Figure 12:
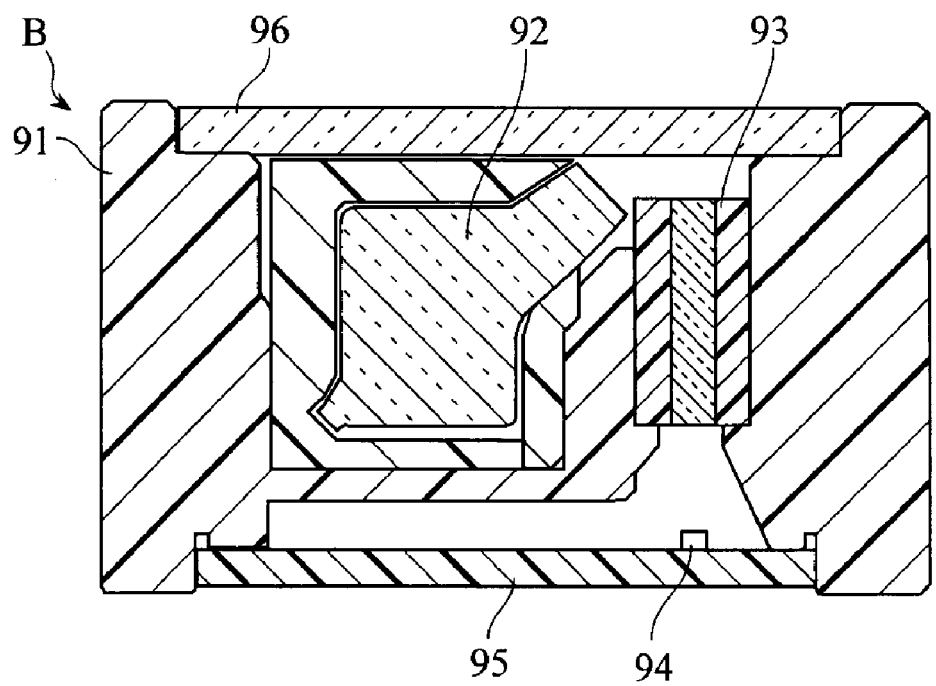
FIG. 12 is a sectional view illustrating an example of conventional image reading apparatus.

Referring to (A) and (B) of FIG. 11, an object P to foe read is placed at a predetermined position on the light, transmitting cover 31 of the image reading apparatus A4 and held in close contact with the cover. In this state, the image reading apparatus A4 performs a reading operation while moving to the right in the figure at a constant speed. Specifically, while moving a distance which is equal to the pitch t, the image reading apparatus A4 simultaneously performs the reading process using the optical system S1' (first reading process), the reading process using the optical system S2' (second reading process) and the reading process using the optical system S3 (third reading process).

In the first reading process by the optical system S1', each line of the object P is successively illuminated with red light, green light and blue light emitted from the light source unit 50 in a predetermined order. In each of the illumination processes using red light, green light and blue light for each line, the light reflected by the object P is received by the light receiving elements 32a through the lens unit 33, and the light receiving elements 32a output a luminance signal of a level corresponding to the amount of light received. In this way, of the surface of the object P, the RGB color image in a predetermined region (first region) having a width t is read by the optical system S1' as image data.

In the second reading process by the optical system S2', each line of the object P is successively illuminated with red light, green light and blue light emitted from the light source unit 50 in a predetermined order. In each of the illumination processes using red light, green light and blue light for each line, the light, reflected by the object P is received by the light receiving elements 32a through the lens unit 33, and the light receiving elements 32a output a luminance signal of a level corresponding to the amount of light received. In this way, of the surface of the object P, the RGB color image in another predetermined region (second region, which is on the left of the first region in FIG. 11) having a width t is read by the optical system S2' as image data.

In the third reading process by the optical system S3, each line of the object P is successively illuminated with red light, green light and blue light emitted from the light source unit 50 in a predetermined order. In each of the illumination processes using red light, green light and blue light for each line, the light reflected by the object P is received by the light receiving elements 32a through the lens unit 33, and the light receiving elements 32a output a luminance signal of a level corresponding to the amount of light received. In this way, of the surface of the object P, the RGB color image in another predetermined region (third region, which is on the left of the second region in FIG. 11) having a width t is read by the optical system S3 as image data.

The obtained partial images of the first through the third regions each having a width t are combined by the digital image processing, whereby a color image having a width 3×t in the secondary scanning direction y is obtained.

Then, as illustrated in FIG. 11 (C), the image reading apparatus A4 moves, without performing a reading operation, a distance corresponding to 2×t in the secondary scanning direction y at a relatively high speed. Thus, the optical system S3 reaches the end of a region which is to be read next. The image reading apparatus A4 does not read the regions of the object P which have already been read.

The processes described above with reference to (A), (B), (C) of FIG. 11 (i.e., the first through the third simultaneous reading processes and the high-speed moving process) are repeated until the entire region of the object P extending in the secondary scanning direction y is read. Thus, image data is obtained with respect to the entirety of the surface of the object P.

In the above-described process to read the object P, the image reading apparatus jumps a distance of 2×t at a time in the secondary scanning direction y. Thus, as compared with the conventional image reading apparatus in which the speed of the relative movement between the image reading apparatus and the image-carrying object is maintained relatively low, the image reading apparatus A4 is more suitable for shortening the time required for reading.

Although the image reading apparatus A4 in this embodiment includes the above-described optical systems S1', S2' and S3, the image reading apparatus may include two optical systems or four or more optical systems each of which includes a light receiving substrate 32, a lens unit 33 and a light emission unit 50.

According to the present invention, the following variations may be provided.

According to a first aspect of the present invention, an image reading apparatus includes:

a first light source for emitting first light;

a first light guide member for directing the first light emitted from the first light source toward an object to be read as first linear light extending in a primary scanning direction;

a second light source for emitting second light of a wavelength that is different from a wavelength of the first light;

a second light guide member for directing the second light emitted from the second light source toward the object as second linear light extending in the primary scanning direction;

a plurality of light receiving elements arranged in the primary scanning direction; and a lens unit that causes reflected light of the first light from the object to be directed toward the light receiving elements, and also causes reflected light of the second light from the object to be directed toward the light receiving elements.

Preferably, in the first aspect, the first light guide member and the second light guide member extend in the primary scanning direction in parallel to each other. The lens unit extends in the primary scanning direction and is positioned between the first and the second light guide members.

Preferably, each of the first light guide member and the second light guide member includes a first end on one side in the primary scanning direction and a second end on the other side in the primary scanning direction. The first light source is arranged on the side of the first end of the first light guide member, whereas the second light source is arranged on the side of the second end of the second light guide member.

Preferably, the first light source is an infrared light source, the first light guide member is made of acrylic resin, the second light source is an ultraviolet light source, and the second light guide member is made of cyclo olefin polymer.

According to a second aspect of the present invention, an image reading apparatus includes:

a light emitting substrate including a mount surface on which a plurality of light emitting elements are arranged in a primary scanning direction, each of the plurality of emitting elements being for emitting light to illuminate an object to be read;

a light receiving substrate on which a plurality of light receiving elements are arranged in the primary scanning direction; and a lens unit for causing reflected light of the object-illuminating light to be directed toward the light receiving elements, where the object to be read is spaced from the light receiving substrate in a thickness direction that is perpendicular to both the primary scanning direction and the secondary scanning direction.

The light emitting substrate may be spaced from the lens unit in the secondary scanning direction and arranged in such a manner that its mount surface stands in the thickness direction.

In a first embodiment according to the second aspect, the mount surface of the light emitting substrate is oriented toward the lens unit. Preferably, in this case, the image reading apparatus is provided with a reflective surface for reflecting the light from the light emitting elements toward the object to be read. Preferably, in this case, the mount surface of the light emitting substrate is designed to reflect light. The above-described reflective surface includes a direct reflection surface for reflecting the light from the light emitting elements directly toward the object to be read, and an indirect reflection surface for reflecting the light from the light emitting elements toward the mount surface to cause the light to travel toward the object to be read via the mount surface. Preferably, in this case, the direct reflection surface is positioned closer to the object to be read than the indirect reflection surface is, in the thickness direction. Preferably, the indirect reflection surface is a concave surface. Preferably, the indirect reflection surface overlaps the light emitting elements in the thickness direction.

In a second embodiment according to the second aspect, the mount surface of the light emitting substrate is oriented in the opposite direction of the lens unit. Preferably, in this case, the image reading apparatus is provided with a reflected surface for reflecting the light from the light emitting elements toward the object to be read. Preferably, in this case, the reflective surface is a concave surface.

Preferably, in the second aspect, the light emitting substrate, the light receiving substrate and the lens unit constitute a single optical system, and the apparatus incorporates a plurality of such optical systems.

Preferably, in the second aspect, a light source unit is arranged on the side of the lens unit which is opposite to the light emitting substrate in the secondary scanning direction, and the light source unit emits light toward the object to be read, where the emitted light has a wavelength which is different from that of the light from the light emitting elements. Preferably, in this case, the light source unit includes: a light emitting device for emitting light of the wavelength different from that of the light emitting elements; and a light guide member for directing the light emitted from the light emitting device toward the object to be read as linear light extending in the primary scanning direction.

According to a third aspect of the present invention, an image reading apparatus includes a plurality of optical systems arranged in a secondary scanning direction, where each of the optical systems includes:

a light emission unit for emitting light to illuminate an object to be read;

a plurality of light receiving elements arranged in a primary scanning direction; and a lens unit for causing reflected light of the object-illuminating light to be directed toward the light receiving elements, where the object to be read is spaced from the light receiving elements in a thickness direction that is perpendicular to both the primary scanning direction and the secondary scanning direction.

Preferably, the light emission units of the respective optical systems emit light of different wavelengths.

Preferably, in at least one of the optical systems, the light emission unit includes a light emitting substrate including a mount surface on which a plurality of light emitting elements are arranged in the primary scanning direction. The light emitting substrate is spaced from the lens unit in the secondary scanning direction and arranged in such a manner that its mount surface stands in the thickness direction. Preferably, in this case, the mount surface of the light emitting substrate is oriented toward the lens unit. Preferably, the image reading apparatus is provided with a reflected surface for reflecting the light from the light emitting elements toward the object to be read. In this case, the mount surface of the light emitting substrate is designed to reflect light. The above-described reflective surface includes a direct reflection surface for reflecting the light from the light emitting elements directly toward the object to be read, and an indirect reflection surface for reflecting the light from the light emitting elements toward the mount surface to cause the light to travel toward the object to be read via the mount surface.

Preferably, in the third aspect, in at least one of the optical systems, the light emission unit includes a light source and a light guide member for directing the light emitted from the light source toward the object to be read as linear light extending in the primary scanning direction. Preferably, in at least one of the optical systems, the light emission unit includes a light emitting substrate including a mount surface on which a plurality of light emitting elements are arranged in the primary scanning direction. The light emitting substrate is spaced from the lens unit in the secondary scanning direction and arranged in such a manner that the mount surface stands in the thickness direction.

Preferably, in the third aspect, the light emission units of the plurality of optical systems emit light of the same wavelength. Preferably, in this case, in each of the optical systems, the light emission unit includes a light source and a light guide member for directing the light emitted from the light source toward the object to be read as linear light extending in the primary scanning direction.

The invention claimed is:

1. An image reading apparatus comprising:
a first light source for emitting first light;
a first light guide member for directing the first light emitted from the first light source toward an object to be read as first linear light extending in a primary scanning direction;
a second light source for emitting second light of a wavelength different from a wavelength of the first light;
a second light guide member for directing the second light emitted from the second light source toward the object as second linear light extending in the primary scanning direction;
a plurality of light receiving elements arranged in the primary scanning direction; and
a lens unit that causes reflected light of the first linear light from the object to be direct toward the light receiving elements, and also causes reflected light of the second linear light from the object to be directed toward the light receiving elements;
wherein the first light guide member and the second light guide member extend in the primary scanning direction in parallel to each other, and the lens unit extends in the primary scanning direction and is positioned between the first and the second light guide members, and
wherein each of the first light guide member and the second light guide member includes a first end on one side in the primary scanning direction and a second end on another side in the primary scanning direction, the first light source being arranged on a side of the first end of the first light guide member, the second light source being arranged on a side of the second end of the second light guide member.

2. The image reading apparatus according to claim 1, wherein the first light source is an infrared light source.

3. The image reading apparatus according to claim 2, wherein the first light guide member is made of acrylic resin.

4. The image reading apparatus according to claim 1, wherein the second light source is an ultraviolet light source.

5. The image reading apparatus according to claim 1, wherein the first light source is an infrared light source, the first light guide member is made of acrylic resin, the second light source is an ultraviolet light source, and the second light guide member is made of cyclo olefin polymer.

* * * * *